(12) United States Patent
Isoda et al.

(10) Patent No.: US 6,995,493 B2
(45) Date of Patent: Feb. 7, 2006

(54) ROTOR OF ROTATING ELECTRIC MACHINE

(75) Inventors: Hitoshi Isoda, Tokyo (JP); Yoshihito Asao, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/965,797

(22) Filed: Oct. 18, 2004

(65) Prior Publication Data

US 2005/0088055 A1    Apr. 28, 2005

(30) Foreign Application Priority Data

Oct. 27, 2003    (JP) ............................ P2003-365380

(51) Int. Cl.
    *H02K 5/24*    (2006.01)
(52) U.S. Cl. ........................................ 310/263; 310/51
(58) Field of Classification Search ................ 310/263, 310/156.66–156.73, 51
    See application file for complete search history.

(56) References Cited

U.S. PATENT DOCUMENTS

| | | | | |
|---|---|---|---|---|
| 2,588,175 A | * | 3/1952 | Stewart et al. ............... | 310/168 |
| 5,132,581 A | * | 7/1992 | Kusase ........................ | 310/263 |
| 5,241,230 A | * | 8/1993 | Tanaka et al. ................ | 310/62 |
| 5,543,676 A | * | 8/1996 | York et al. ................... | 310/263 |
| 5,714,822 A | * | 2/1998 | Kawano et al. .............. | 310/179 |
| 5,780,953 A | * | 7/1998 | Umeda et al. ............... | 310/263 |
| 5,994,802 A | * | 11/1999 | Shichijyo et al. ............. | 310/51 |
| 6,020,669 A | * | 2/2000 | Umeda et al. ............... | 310/263 |
| 6,034,464 A | * | 3/2000 | Asao ........................... | 310/263 |
| 6,720,703 B1 | * | 4/2004 | Braun et al. ................. | 310/263 |
| 6,853,112 B2 | * | 2/2005 | Nakamura et al. ........... | 310/263 |

FOREIGN PATENT DOCUMENTS

| | | |
|---|---|---|
| JP | 9-163700 A | 6/1997 |
| JP | 2001-286099 A | 10/2001 |

\* cited by examiner

*Primary Examiner*—Dang Le
(74) *Attorney, Agent, or Firm*—Sughrue Mion, PLLC (57) ABSTRACT

According to the invention, in a rotor of a vehicular alternating current generator motor having a Lundell type core having a field winding, a cylindrical portion wound with the field winding, a yoke portion widened from a portion in an axial direction of the cylindrical portion in an outer peripheral direction, and a plurality of claw-like magnetic pole portions constituted to incorporate the field winding, extended in the axial direction from an outer periphery of the yoke portion and folded to bend to be brought in mesh with each other alternately, and a magnet arranged between the claw-like magnetic poles, an outer peripheral face of the field winding and an inner peripheral face of the magnet are made to be proximate to each other to thereby hamper draft between the field winding and the magnet.

7 Claims, 6 Drawing Sheets

ROTOR OF ROTATING ELECTRIC MACHINE

BACKGROUND OF THE INVENTION

1. Field of the Invention

The present invention relates to a rotor of a rotating electric machine, particularly relates to a constitution for reducing wind sound by a flow of air at inside of a rotor core in a rotor structure of a vehicular alternating current generator or a vehicular alternating current generator motor.

2. Description of the Related Art

A core of a rotor of a rotating electric machine according to a related art includes a field winding and a cylindrical portion wound with the field winding via an insulating member, a yoke portion widened from the cylindrical portion in an outer peripheral direction, and a plurality of claw-like magnetic poles extended in an axial direction from an outer periphery of the yoke portion to surround to incorporate the field coil and fold to bend to be brought in mesh with each other alternately. As described above, the claw-like magnetic pole portion is constituted by a cantilever shape and a certain constant clearance between the magnetic poles is provided between contiguous ones of the claw-like magnetic poles such that a magnetic flux is prevented from being leaked between the two claws.

According to the rotating electric machine having above-described Lundell type rotor, the magnetic flux is generated by making current flow at the field winding, by a change in the magnetic flux generated in accordance with rotation of the rotor, alternating current is made to flow at an armature winding to provide a power generating function.

Further, in recent years, there is also a rotor constituted by arranging a magnet between the claw-like magnetic poles for increasing an output (refer to, for example, Patent Reference 1).

[Patent Reference 1] JP-A-9-163700

According to the related art, there is a space between the field winding wound around the cylindrical portion of the core and an inner peripheral face of the claw-like magnetic pole as well as between the claw-like magnetic poles, in rotating the rotor, wind sound is emitted by draft both from a front side and a rear side, particularly, a component thereof in a peripheral direction produced between the inner periphery of the claw-like magnetic pole and an outer peripheral face of the field winding to cause noise of vehicular alternating current generator. Particularly, since draft paths by a number of magnetic poles multiplied by an integer are formed, noise having a component of a number of an order of the number of magnetic poles multiplied by an integer is emitted to pose a problem of noise.

Further, in recent years, although there is a case of applying a magnet between the claw-like magnetic poles in order to increase power, even in such a case, there are spaces among the field winding wound around the cylindrical portion of the core and inner peripheral faces of the claw-like magnetic poles and an inner peripheral face of the magnet, faces of the field windings opposed thereto are constituted by recesses and projections by the magnet and therefore, wind sound is similarly emitted by draft both from the front side and the rear side to cause the noise of the vehicular alternating current generator.

SUMMARY OF THE INVENTION

It is an object of the invention to provide a rotor of a rotating electric machine for restraining draft among a field winding and a claw-like magnetic pole portion and a magnet and capable of reducing wind sound emitted from the rotor.

According to a rotor of a rotating electric machine of the invention, in a rotor of a rotating electric machine including a Lundell type core having a cylindrical portion wound with a field winding, a yoke portion widened from a position in an axial direction of the cylindrical portion in an outer peripheral direction, a plurality of claw-like magnetic pole portions constituted to incorporate the field winding, extended in the axial direction from an outer periphery of the yoke portion and folded to bend to be brought in mesh with each other alternately and a magnet arranged between the claw-like magnetic poles, an outer peripheral face of the field winding and an inner peripheral face of the magnet are made to be proximate to each other to hamper draft between the field winding and the magnet.

According to the invention, the rotor of the rotating electric machine restraining draft among the field winding and the claw-like magnetic pole portion and the magnet and capable of reducing wind sound emitted from the rotor can be provided.

DETAILED DESCRIPTION OF THE INVENTION

Embodiment 1

Figure 1:
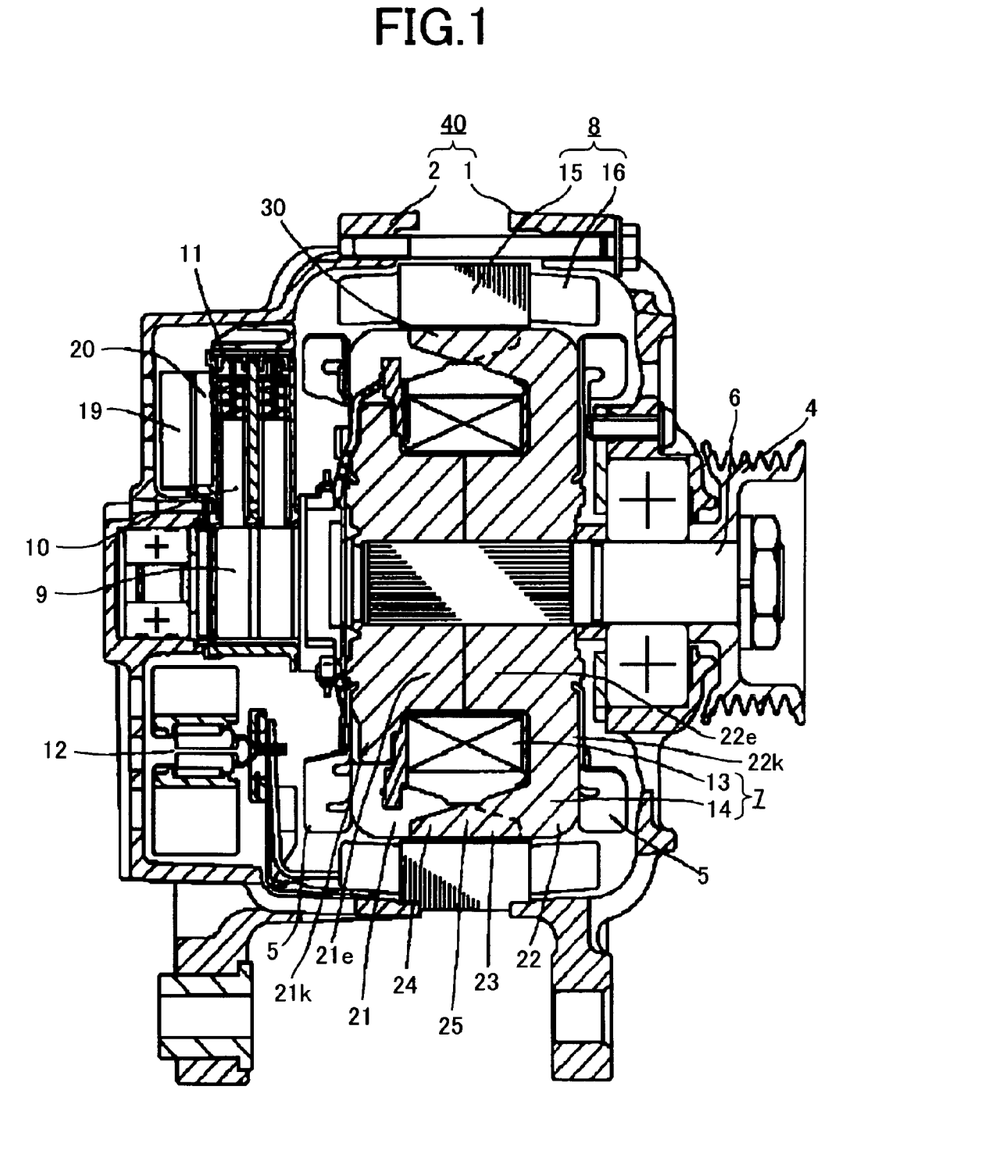
FIG. 1 is a sectional view of an essential portion showing a structure of a section of a rotating electric machine in an axial direction according to an embodiment of the invention.
Figure 2:
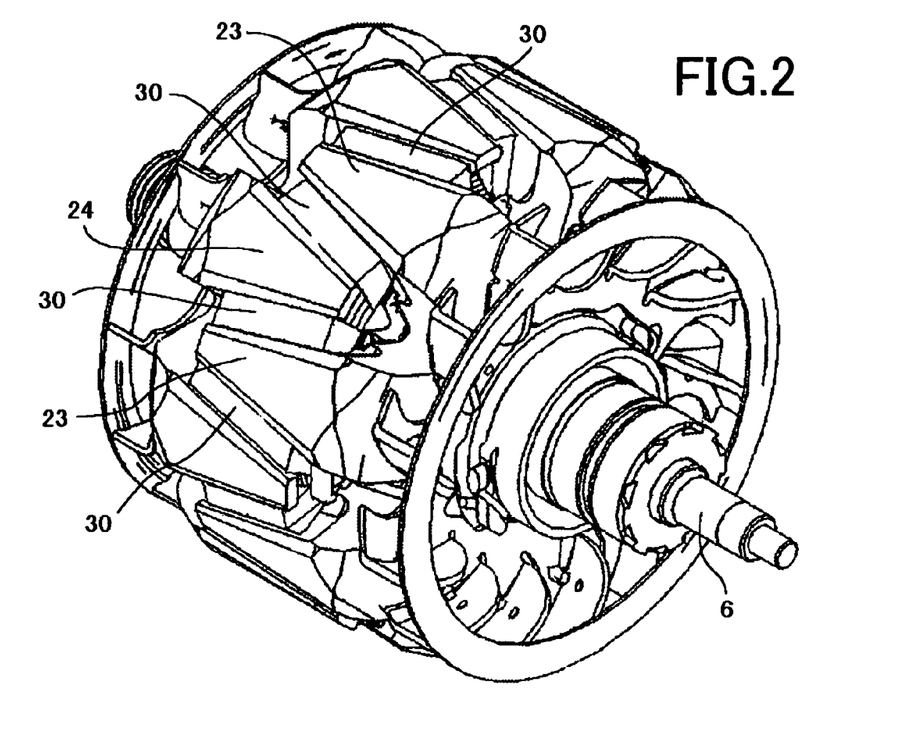
FIG. 2 is a perspective view showing a structure of a rotor according to Embodiment 1 of the invention.
Figure 3:
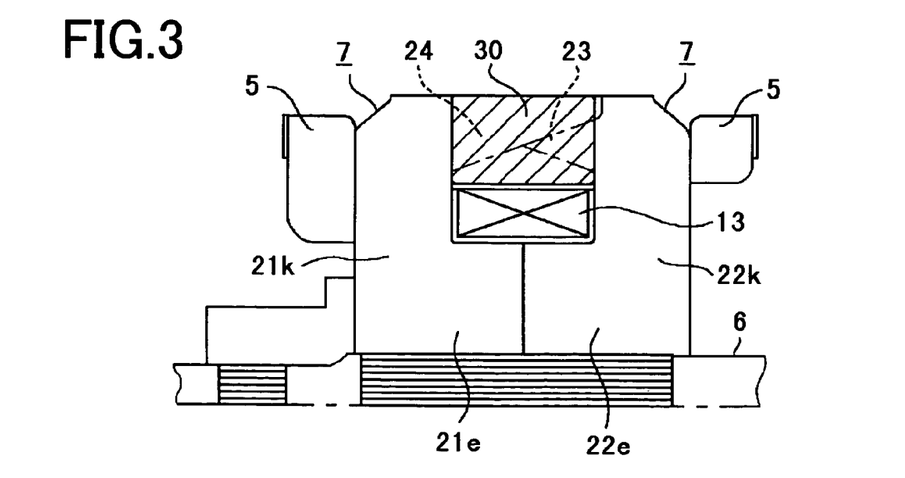
FIG. 3 is a sectional view of an essential portion showing the structure of the rotor according to Embodiment 1 of the invention.

Embodiment 1 according to the invention will be explained in reference to FIG. 1 through FIG. 3. FIG. 1 is a sectional view of a rotating electric machine according to an embodiment of the invention, FIG. 2 is a perspective view of a rotor when a structure of a rotor is used in a rotor of a vehicular rotating electric machine, and FIG. 3 is a sectional view of a core portion of the rotor.

The rotating electric machine is provided with a case 40 constituted by a front bracket 1 and a rear bracket 2 made of aluminum, a shaft 6 provided at inside of the case 40 and fixed with a pulley 4 at one end portion thereof, a rotor 7 fixed to the shaft 6, fans 5 fixed to both side faces of the rotor 7, an armature 8 fixed to an inner wall face at inside of the case 40, a slip ring 9 fixed to other end portion of the shaft 6 for supplying current to the rotor 7, a pair of brushes 10 sliding on the slip ring 9, a brush holder 11 containing the brushes 10, a rectifier 12 electrically connected the armature 8 for rectifying alternating current generated at the armature 8 into direct current, a heat sink 19 fitted to attach to the brush holder, and a regulator 20 adhered to the heat sink for regulating a magnitude of alternating current voltage generated at the armature 8. The armature 8 is constituted by an armature core 15 and an armature winding 16 wound around the armature core 15.

The rotor 7 is provided with a field winding 13 as a rotor coil in a cylindrical shape for generating a magnetic flux by making current flow therein, and a pole core 14 provided to cover the rotor coil 13 and formed with a magnetic pole by the magnetic flux.

The pole core 14 is constituted by a pair of a first pole core member 21 and a second pole core member 22 brought in mesh with each other alternately. The pole core member 21 and the pole core member 22 are normally made of iron and comprise cylindrical portions 21e, 22e wound with the rotor coil 13, and yoke portions 21k, 22k in a circular disk shape projected with the cylindrical portions 21e, 22e. Outer edges of the yoke portions 21k, 22k are respectively provided with pluralities of claw-like magnetic poles 23, 24 brought in mesh with each other at positions between an outer periphery of the rotor coil 13 and an inner periphery of the armature 8.

The claw-like magnetic poles 23, 24 are constituted by a shape in which thicknesses and widths on sides of the yoke portions 21k, 22k are large and the thicknesses and the widths become slender as proceeding to front end sides thereof. Thicknesses of inner peripheral faces of the claw-like magnetic poles 23, 24 are thinned as proceeding to front ends thereof and outer peripheral faces thereof are constituted by an arcuate shape along an inner peripheral face of the stator 8.

The claw-like magnetic poles 23, 24 are provided with two side faces in a trapezoidal shape relative to a peripheral direction of the rotor 7. Front ends of the respective claw-like magnetic poles 23, 24 are alternately brought in mesh with each other to be opposed to each other and therefore, inclinations of the inner peripheral faces of the claw-like magnetic poles 23, 24 are aligned alternately in the peripheral direction.

Further, side faces of the claw-like magnetic poles 23, 24 are inclined to center sides of the claw-like magnetic poles 23, 24 such that the front end sides become slender as proceeding from root sides to the front end sides.

Further, an interval between contiguous ones of the claw-like magnetic poles 23, 24 is fixedly attached with a magnet 30 in a shape of a parallelepiped magnetized in a direction of reducing leakage of the magnetic flux by both of the side faces opposed to each other and the magnet 30 is attached thereto by using a holding member for alleviating a centrifugal force.

As shown by FIG. 1 through FIG. 3, the rotor core 7 of the rotating electric machine includes the field winding 13 and the cylindrical portions 21e, 22e wound with the field winding 13 via the insulting member, the yoke portions 21k, 22k constituted by base portions in the circular disc shape widened from the positions in the axial direction of the cylindrical portions 21e, 22e in the outer peripheral direction, and the plurality of claw-like magnetic poles 23, 24 extended in the axial direction from the outer peripheries of the yoke portions 21k, 22k to surround to incorporate the field winding 13 and folded to bend to be brought in mesh with each other. As described above, the claw-like magnetic pole portions 23, 24 are constituted by the cantilever shape, and the magnet 30 is arranged between the claw-like magnetic poles 23, 24 such that the outer peripheral face of the field winding 13 and the inner peripheral face of the magnet 30 become proximate to each other. According to the embodiment, the outer peripheral face of the field winding 13 is constituted to be equal to or smaller than a root diameter of the claw-like magnetic poles 23, 24.

In this way, by making the outer peripheral face of the field winding 13 and the inner peripheral face of the magnet 30 arranged between the claw-like magnetic poles 23, 24 proximate to each other, draft in the claw-like magnetic poles 23, 24 is restrained and wind sound is reduced.

According to Embodiment 1 of the invention, in the rotor of the vehicular alternating current generator motor including the Lundell type core having the field winding 13, the cylindrical portions 21e, 22e wound with the field winding 13, the yoke portions 21k, 22k widened from the positions in the axial direction of the cylindrical portions 21e, 22e in the outer peripheral direction, and the plurality of claw-like magnetic pole portions 23, 24 constituted to incorporate the field winding 13 by surrounding to incorporate the field winding 13, extended from the outer peripheries of the yoke portions in the axial direction and folded to bend to be brought in mesh with each other alternately, and the magnet 30 arranged between the claw-like magnetic poles 23, 24, the outer peripheral face of the field winding 13 and the inner peripheral face of the magnet 30 are made to be proximate to each other, a draft path between the field winding 13 and the magnet 30 is brought into a closed state to hamper draft between the field winding 13 and the magnet 30 and therefore, the outer peripheral face of the field winding 13 and the inner peripheral face of the magnet 30 become proximate to each other to hamper draft between the field winding 13 and the magnet 30 and therefore, draft among the field winding 13 and the claw-like magnetic pole portions 23, 24 and the magnet 30 is restrained and wind sound emitted from the rotor is reduced.

Further, according to Embodiment 1 of the invention, in the constitution of the preceding item, there is provided the field winding wound such that an outermost peripheral portion of the field winding 13 becomes equal to or smaller than the root diameter of the claw-like magnetic poles 23, 24 to thereby make the inner peripheral face of the magnet 30 and the outermost periphery of the field winding 13 proximate to each other and therefore, the inner peripheral face of the magnet 30 is smaller than the root diameter of the magnetic claws 23, 24 and therefore, the draft path between the magnetic poles 23, 24 can be closed by the magnet 30 and draft can firmly be restrained. Further, since the magnet 30 is present in the space at side faces of the roots of the claw-like magnetic poles 23, 24 and therefore, draft flowing from the front side and the rear side in the axial direction is also restrained and noise is reduced.

Embodiment 2

Figure 4:
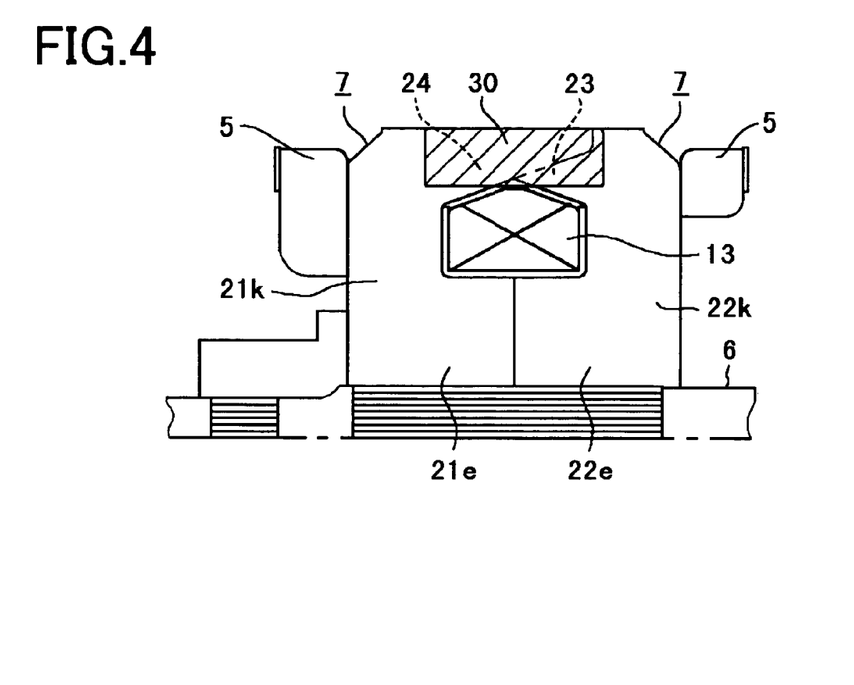
FIG. 4 is a sectional view of an essential portion showing a structure of a rotor according to Embodiment 2 of the invention.

Embodiment 2 according to the invention will be explained in reference to FIG. 4. FIG. 4 is a sectional view of a rotor core portion when a structure of a rotor according to Embodiment 2 is used in a rotor of a vehicular rotating electric machine.

According to Embodiment 2, as shown by FIG. 4, the outer peripheral face of the field winding 13 is made to be equal to or larger than the root diameter of the claw-like magnetic poles 23, 24 and the magnet 30 is arranged between the claw-like magnetic poles 23, 24 such that the outer peripheral face of the field winding 13 and the inner peripheral face of the magnet 30 become proximate to each other. Further, the field winding 13 is wound such that also the inner peripheral faces of the roots of the claw-like magnetic poles 23, 24 and the outer peripheral face of the field winding 13 become proximate to each other.

In this way, by making the outer peripheral face of the field winding 13 and the inner peripheral faces of the roots of the claw-like magnet poles 23, 24 as well as the outer peripheral face of the field winding 13 and the inner peripheral face of the magnet 30 proximate to each other, draft passing the inner peripheral face of the claw-like magnetic poles 23, 24 is also restrained and wind sound is reduced. Further, by reducing the width of recesses and projections of the inner peripheral face of the claw-like magnetic poles 23, 24 and the inner peripheral face of the magnet 30, disturbance of draft is reduced and wind sound is reduced.

Further, according to Embodiment 2, a space of winding the field winding 13 can be increased and therefore, a magnetomotive force by the field winding 13 can be increased. Or, current (flowing to the field winding 13) necessary for providing the same magnetomotive force is reduced and therefore, temperature rise of the field winding 13 can be restrained.

Further, a volume of the magnet 30 is reduced and therefore, cost taken by the magnet can be reduced.

According to Embodiment 2 of the invention, in the constitution of Embodiment 1, there is provided the field winding 13 wound such that the outermost periphery of the field winding 13 becomes equal to or larger than the root diameter of the claw-like magnetic poles 23, 24, the inner peripheral face of the magnet 30 and the outermost periphery of the field winding 13 are made to be proximate to each other and therefore, the outer peripheral face of the field winding 13 and the inner peripheral faces of the roots of the claw-like magnetic poles 23, 24 as well as the outer peripheral face of the field winding 13 and the inner peripheral face of the magnet 30 become proximate to each other and therefore, draft passing the inner peripheral faces of the claw-like magnetic poles 23, 24 is also restrained and wind sound is reduced. When the field winding 13 is wound such that the outermost periphery of the field winding 13 becomes equal to or larger than the root diameter of the claw-like magnetic poles 23, 24, a line of projecting the inner peripheral face of the magnet 30 to side faces of the claw-like magnetic poles 23, 24 is disposed on the inner peripheral faces of the claw-like magnetic poles 23, 24, the recesses and projections of the inner peripheral faces of the claw-like magnetic poles 23, 24 and the inner peripheral face of the magnet 30 are reduced and therefore, disturbance of draft of the component in the peripheral direction is reduced and wind sound is reduced. Further, since the space of winding the field winding 13 is increased and therefore, when current made to flow to the field winding 13 stays the same, the magnetomotive face by the field winding 13 can be increased. Or, in achieving the same magnetomotive face, necessary current made to flow to the field winding 13 is reduced and temperature rise of the field winding 13 can be restrained. Further, since the volume of the magnet 30 is reduced, cost taken by the magnet 30 can be reduced.

Embodiment 3

Figure 5:
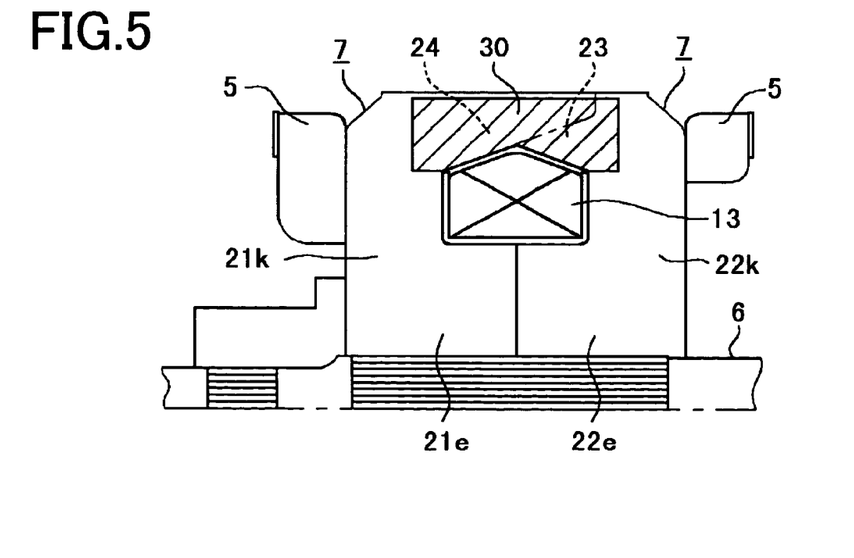
FIG. 5 is a sectional view of an essential portion showing a structure of a rotor according to Embodiment 3 of the invention.

Embodiment 3 according to the invention will be explained in reference to FIG. 5. FIG. 5 is a sectional view of a rotor core portion when a structure of a rotor according to Embodiment 3 is used in a rotor of a vehicular rotating electric machine.

According to Embodiment 3, as shown by FIG. 5, in the shape of the magnet 30 arranged between the claw-like magnetic poles 23, 24, the inner peripheral face of the magnet 30 is constituted to be substantially in parallel with at least portions of the inner peripheral faces of the magnetic poles 23, 24. Further, both ends of the magnet 30 are constituted to cover the side faces of the roots of the claws 23, 24.

In this way, since the inner peripheral face of the magnet 30 is substantially in parallel with the inner peripheral faces of the magnetic poles 23, 24, recesses and projections of the inner peripheral face of the magnet 30 and the inner peripheral faces of the magnetic poles 23, 24 are not present, disturbance of draft is eliminated and wind sound is reduced. Further, spaces of the side faces of the roots of the claw-like magnetic poles 23, 24 can be sealed by the magnet 30, draft is restrained and noise is reduced.

According to Embodiment 3 of the invention, in the constitution of the Embodiment 2, at least a portion of the inner peripheral face of the magnet 30 arranged between the claw-like magnetic poles 23, 24 is constituted to be substantially in parallel with the inner peripheral faces of the magnetic poles 23, 24 and therefore, by making the inner peripheral face of the magnet 30 and the inner peripheral faces of the magnetic poles 23, 24 substantially in parallel with each other, recesses and projections of the inner peripheral faces of the claw-like magnetic poles 23, 24 and the inner peripheral face of the magnet 30 are reduced, disturbance of draft is reduced and therefore, wind sound is further reduced.

Embodiment 4

Figure 6:
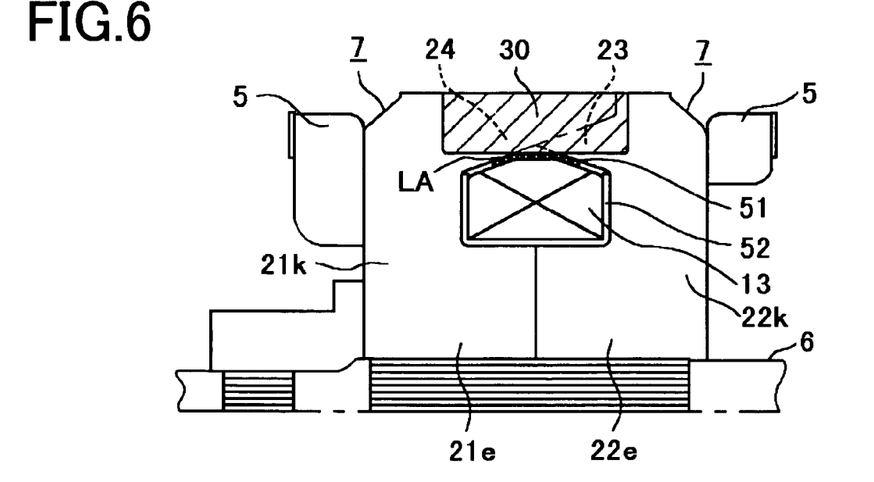
FIG. 6 is a sectional view of an essential portion showing a structure of a rotor according to Embodiment 4 of the invention.

Embodiment 4 according to the invention will be explained in reference to FIG. 6. FIG. 6 is a sectional view of a rotor core portion when a structure of a rotor according to Embodiment 4 is used in a rotor of a vehicular rotating electric machine.

According to Embodiment 4, as shown by FIG. 6, an insulating layer LA is formed at the outer periphery of the field winding 13 by using an insulating member 51 of a tape or the like and is brought into contact with the magnet 30.

By bringing the magnet 30 and the insulating member 51 formed at the outer periphery of the field winding 13 into contact with each other in this way, the clearance between the inner peripheral face of the magnet 30 and the insulating member 51 is completely eliminated, and wind sound is further reduced. Further, since the magnet 30 and the insulating member 51 are brought into contact with each other, vibration of the magnet is reduced and noise is reduced.

Further, although according to Embodiment 4, the insulting layer LA is formed at the field winding 13 by using the insulating member 51 of an outer peripheral tape or the like, the insulating layer LA may be formed at the outer peripheral portion of the field winding 13 by extending an insulating member 52 for insulating the rotor core 7 and the field winding 13.

According to Embodiment 4 of the invention, in any constitution of Embodiment 1 through Embodiment 3, the insulating layer LA is formed by arranging the insulating member 51 or the insulating member 52 at the outer periphery of the field winding 13 by surrounding to incorporate the outer periphery of the field winding 13 by the insulating member 51 or the insulating member 52, and the insulting member 51 or the insulating member 52 arranged at the outer periphery of the field winding 13 is brought into contact with the inner peripheral face of the magnet 30 and therefore, by forming the insulating layer LA at the outer periphery of the field winding 13, insulation between the magnet 30 and the outer periphery of the field winding 13 is sufficiently maintained and therefore, the magnet 30 and the insulating member 51 or the insulating member 52 formed at the outer periphery of the field winding 13 can be brought into contact with each other, the clearance between the inner peripheral face of the magnet 30 and the insulating member 51 or the insulating member 52 is completely eliminated and wind sound is further reduced.

Embodiment 5

Figure 7:
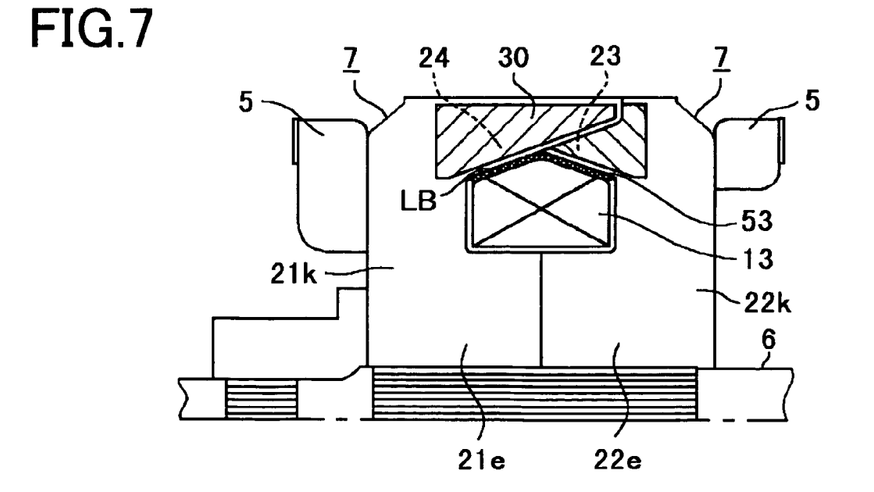
FIG. 7 is a sectional view of an essential portion showing a structure of a rotor according to Embodiment 5 of the invention.

Embodiment 5 according to the invention will be explained in reference to FIG. 7. FIG. 7 is a sectional view of a rotor core portion when a structure of a rotor according to Embodiment 5 is used in a rotor of a vehicular rotating electric machine.

According to Embodiment 5, as shown by FIG. 7, an insulating layer LB is formed at the outer periphery of the field winding 13 by using an insulting member 53 of a tape or the like and is brought into contact with the inner peripheral faces of the claw-like magnetic poles 23, 24.

By bringing the inner peripheral faces of the claw-like magnetic poles 23, 24 and the insulting member 53 formed at the outer periphery of the field winding 13 into contact with each other in this way, the clearance between the inner peripheral faces of the claw-like magnetic poles 23, 24 and the insulating member 53 is completely eliminated and wind sound is further reduced.

Further, since the inner peripheral faces of the claw-like magnetic poles 23, 24 and the insulating member 53 are brought into contact with each other, rigidities of the claw-like magnetic poles 23, 24 are increased and resonance of the claw-like magnetic poles 23, 24 by a magnetic force is restrained.

According to Embodiment 5 of the invention, in any constitution of Embodiment 1 through Embodiment 4, the insulating layer LB is formed by arranging the insulating member 53 at the outer periphery of the field winding 13 by surrounding to incorporate the outer periphery of the magnetic winding 13 by the insulating member 53, the outer peripheral face of the field winding 13 is brought into contact with the inner peripheral faces of the claw magnetic poles 23, 24 and therefore, by forming the insulating layer LB at the outer periphery of the field winding 13, insulation between the claw-like magnetic pole portions 23, 24 and the outer periphery of the field winding 13 is sufficiently maintained and therefore, the inner peripheral faces of the claw-like magnetic pole portions 23, 24 and the insulating member 53 formed at the outer periphery of the field winding 13 can be brought into contact with each other, the clearance between the inner peripheral faces of the claw-like magnetic poles 23, 24 and the insulating member 53 is completely eliminated and wind sound is further reduced.

Embodiment 6

Figure 8:
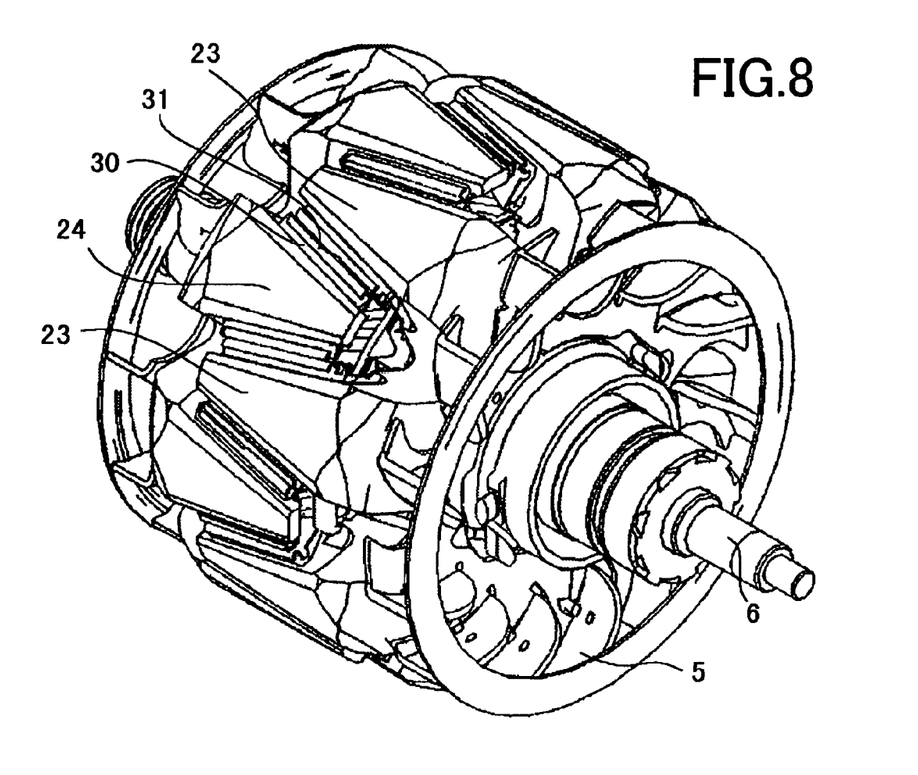
FIG. 8 is a perspective view showing a structure of a rotor according to Embodiment 6 of the invention.

Embodiment 6 according to the invention will be explained in reference to FIG. 8 and FIG. 9. FIG. 8 is a perspective view of a rotor when a structure of a rotor according to Embodiment 6 is used in a rotor of a vehicular rotating electric machine and FIG. 9 is a sectional view of the rotor core portion.

Figure 9:
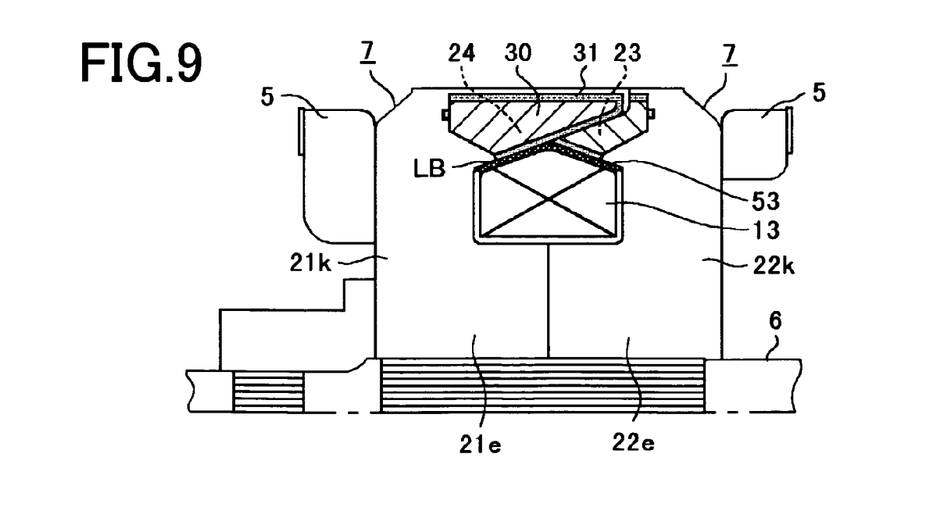
FIG. 9 is a sectional view of an essential portion showing the structure of the rotor according to Embodiment 6 of the invention.

According to Embodiment 6, as shown by FIG. 8 and FIG. 9, the insulating layer LB is formed at the outer periphery of the field winding 13 by using the insulating member 53 of a tape or the like and is brought into contact with a magnet holding member 31 holding the magnet 30 such that the magnet 30 is not stripped off by a centrifugal force or vibration.

By bringing an inner peripheral face of the magnet holding member 31 and the insulating member 53 formed at the outer periphery of the field winding 13 into contact with each other in this way, a clearance between the magnet holding member 31 and the insulating member 53 is completely eliminated and wind sound is reduced.

Since the magnet holding member 31 and the insulating member 53 are brought into contact with each other, vibration of the magnet holding member 31 is restrained and noise is reduced.

Further, with regard to heat generation by the field winding 13, heat is diffused by way of the magnet holding member 31 and therefore, there is also achieved an effect of reducing temperature of the field winding 13.

Further, although according to the embodiment, the insulating layer LB is formed at the field winding 13 by using the insulating member 53 of an outer peripheral tape or the like, when the magnet holding member 31 is constituted by an insulating member of a resin or the like, it is not necessary to form the insulating layer at the outer periphery of the field winding 13.

According to embodiment 6 of the invention, in any constitution of Embodiment 1 through Embodiment 5, the insulating layer LB is formed at the outer periphery of the field winding 13 by using the insulting member 53 of a tape or the like and is brought into contact with the magnet holding member 31 holding the magnet 30 such that the magnet 30 is not stripped off by a centrifugal force or vibration, the outer periphery of the field winding 13 is continuously brought into contact with the inner peripheral face of the magnet 30 via the insulating member 53 and therefore, wind sound and vibration noise can be reduced and temperature rise of the field winding 13 can be restrained.

Further, according to Embodiment 6 of the invention, in any constitution of Embodiment 1 through Embodiment 5, the outer periphery of the field winding 13 is brought into contact with the magnet holding member 31 comprising an insulating member of a resin or the like holding the magnet 30 such that the magnet 30 is not stripped off by a centrifugal force or vibration, the outer periphery of the field winding 13 is continuously brought into contact with the inner peripheral face of the magnet 30 via the magnet holding member 31 comprising the insulating member and therefore, wind sound and vibration noise can be reduced.

Embodiment 7

Figure 10:
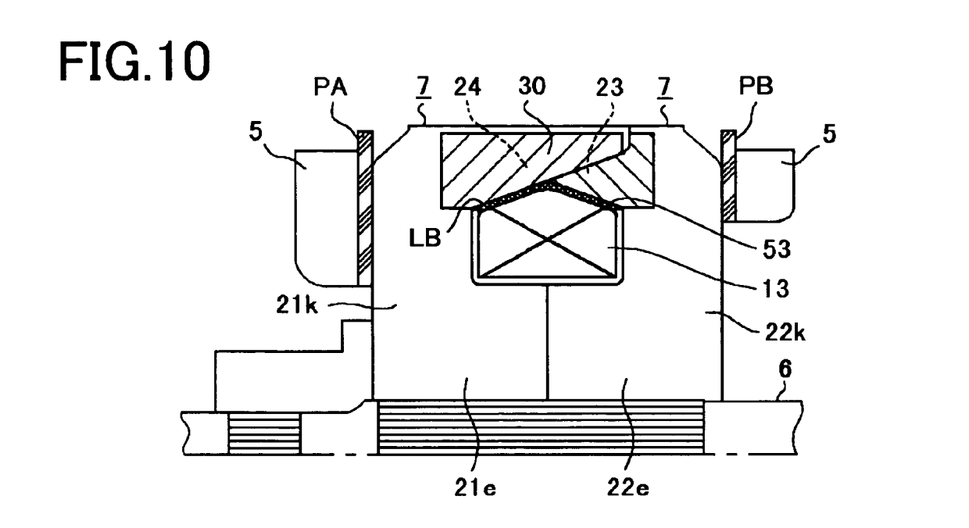
FIG. 10 is a sectional portion of an essential portion showing a structure of a rotor according Embodiment 7 of the invention.

Embodiment 7 according to the invention will be explained in reference to FIG. 10. FIG. 10 is a sectional view of a rotor core portion when a structure of a rotor according to Embodiment 7 is used in a rotor of a vehicular rotating electric machine.

According to Embodiment 7, as shown by FIG. 10, plates PA, PB are provided between the rotor core 7 and the fans 5 disposed at the both side faces of the rotor core 7.

By providing the plates PA, PB between the rotor core 7 and the fans 5 in this way, draft flowing from side faces of the yoke portion 21k, 22k of the rotor core 7 is restrained and wind sound is reduced.

According to Embodiment 7 of the invention, in any constitution of Embodiment 1 through Embodiment 6, the plates PA, PB are provided between the rotor core 7 and the fans 5 disposed at the both side faces of the rotor core 7 and therefore, draft flowing from the side faces of the yoke portions 21k, 22k of the rotor core 7 is restrained and wind sound can be reduced.

Embodiment 8

Embodiment 8 according to the invention will be explained in reference to FIG. 11. FIG. 1 is a perspective view of a rotor when a structure of a rotor according to Embodiment 8 is used in a rotor of a vehicular rotating electric machine.

Figure 11:
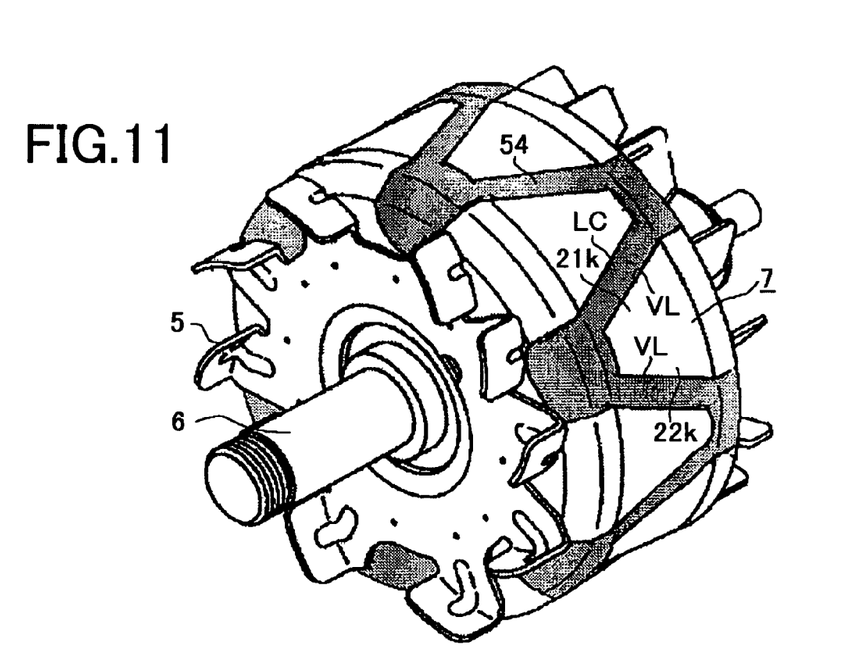
FIG. 11 is a perspective view showing a structure of a rotor according to Embodiment 8 of the invention.

According to Embodiment 8, as shown by FIG. 11, a resin sealing layer LC is constituted by sealing insides of the claw-like magnetic poles 23, 24 by a resin member 54 and at least one portion of valley portions VL constituted at the yoke portions 21k, 22k of the rotor core 7 is constituted to seal.

By sealing inside of the rotor core 7 by the resin in this way, draft at inside of the rotor core 7 is completely eliminated and therefore, wind sound is reduced.

According to Embodiment 8 of the invention, in any constitution of Embodiment 1 through Embodiment 7, the resin sealing layer LC is constituted by sealing insides of the claw-like magnetic poles 23, 24 by the resin member 54, at least one portion of the valley portions VL constituted by the yoke portions 21k, 22k of the rotor core 7 is sealed and therefore, a draft path to inside of the core 7 is closed and therefore, wind sound is further reduced.

Further, although according to the embodiments described in the specification, the vehicular alternating current generator is shown, the invention is applicable to a vehicular alternating current generator motor having the Lundell type rotor.

Further, although according to the embodiments described in the specification, the alternating generator cooled by air by the inner fans is shown, the invention is applicable also to a vehicular alternating current generator having the Lundell type rotor of a water-cooled type or having an outer fan so far as a draft path is provided at inside of the rotor.

What is claimed is:

1. A rotor of a rotating electric machine comprising:
   a Lundell type core including a field winding, a cylindrical portion wound with the field winding, a yoke portion widened from a position in an axial direction of the cylindrical portion in an outer peripheral direction, and a plurality of claw-like magnetic pole portions constituted to incorporate the field winding, extended in the axial direction from an outer periphery of the yoke portion and bend to be brought in mesh with each other alternately; and
   a magnet arranged between the claw-like magnetic poles;
   wherein an outer peripheral face of the field winding and an inner peripheral face of the magnet are made to be proximate to each other to hamper draft between the field winding and the magnet,
   the field winding wound such that an outermost periphery of the field winding becomes equal to or larger than a diameter of a root portion of the claw-like magnetic pole portions and the inner peripheral face of the magnet and the outermost periphery of the field winding are made to be proximate to each other, and
   an insulating layer is formed by arranging an insulating member between an outer periphery of the field winding and the inner peripheral face of the magnet and the outer periphery of the field winding is continuously brought into contact with the inner peripheral face of the magnet via the insulating member.

2. The rotor of a rotating electric machine according to claim 1, wherein the insulating layer is formed by arranging the insulating member at the outer periphery of the field winding and the outer peripheral face of the field winding is brought into contact with an inner peripheral face of the claw-like magnetic pole portions via the insulating member.

3. The rotor of a rotating electric machine according to claim 2, wherein at least or a portion of a valley portion constituted by the yoke portion of the rotor core is sealed by a resin member.

4. The rotor of a rotating electric machine according to claim 2, wherein plates are arranged between fans provided at two side faces of the rotor core and the rotor core to hamper draft flowing from a side face of the yoke portion of the rotor core.

5. The rotor of a rotating electric machine according to claim 2, wherein at least a portion of the inner peripheral face of the magnet arranged between the claw-like magnetic pole positions is constituted to be substantially in parallel with the inner peripheral face of the claw-like magnetic pole portions.

6. The rotor of a rotating electric machine according to claim 1, wherein at least one portion of a valley portion constituted by the yoke portion of the rotor core is sealed by a resin member.

7. The rotor of a rotating electric machine according to claim 1, wherein plates are arranged between fans provided at two side faces of the rotor core and the rotor core to hamper draft flowing from a side face of the yoke portion of the rotor core.

* * * * *